US008599708B2

(12) United States Patent
Chen et al.

(10) Patent No.: US 8,599,708 B2
(45) Date of Patent: Dec. 3, 2013

(54) CHANNEL FEEDBACK BASED ON REFERENCE SIGNAL

(75) Inventors: Wanshi Chen, San Diego, CA (US); Kapil Bhattad, San Diego, CA (US); Peter Gaal, San Diego, CA (US); Alexei Yurievitch Gorokhov, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 13/006,216

(22) Filed: Jan. 13, 2011

(65) Prior Publication Data

US 2012/0020230 A1    Jan. 26, 2012

Related U.S. Application Data

(60) Provisional application No. 61/294,941, filed on Jan. 14, 2010.

(51) Int. Cl.
| | |
|---|---|
| *G06F 11/00* | (2006.01) |
| *H04J 1/16* | (2006.01) |
| *H04L 1/00* | (2006.01) |
| *H04L 12/26* | (2006.01) |

(52) U.S. Cl.
USPC ............................ 370/252; 370/253; 370/254

(58) Field of Classification Search
USPC .......................... 370/252, 253, 254, 328–329
See application file for complete search history.

(56) References Cited

U.S. PATENT DOCUMENTS

| | | | |
|---|---|---|---|
| 2010/0238984 A1* | 9/2010 | Sayana et al. ................. | 375/219 |
| 2011/0141987 A1* | 6/2011 | Nam et al. ..................... | 370/329 |
| 2011/0164691 A1* | 7/2011 | Thomas et al. ................ | 375/259 |
| 2012/0106500 A1* | 5/2012 | Chun et al. .................... | 370/329 |
| 2012/0147773 A1* | 6/2012 | Kim et al. ...................... | 370/252 |
| 2012/0327981 A1* | 12/2012 | Sayana et al. ................. | 375/219 |

FOREIGN PATENT DOCUMENTS

WO    WO2008103091 A1    8/2008

OTHER PUBLICATIONS

Fujitsu: "Considerations on CSI RS design in LTE-A", 3GPP Draft, R1-094331, 3rd Generation Partnership Project (3GPP), Mobile Competence Centre, 650, Route Des Lucioles, F-06921 Sophia-Antipolis Cedex, France, No. Miyazaki, Oct. 12, 2009, XP050388785, [retrieved on Oct. 15, 2009].
International Search Report and Written Opinion—PCT/US2011/021409—ISA/EPO—May 31, 2011.

(Continued)

*Primary Examiner* — Chuong T Ho

(74) *Attorney, Agent, or Firm* — Liem T. Do

(57) ABSTRACT

Techniques for supporting channel measurement and reporting in a wireless communication system are described. In one design, a cell transmits a cell-specific reference signal (CRS) used for channel estimation and coherent demodulation and a channel spatial information reference signal (CSI-RS) used for channel measurement and channel feedback reporting. The cell may transmit the CSI-RS less frequently than the CRS, or from more antenna ports than the CRS, or on fewer resource elements than the CRS, or a combination thereof. In one design, a user equipment (UE) determines at least one bandwidth part configured for the UE, with each bandwidth part covering at least one subband. The UE receives the CRS and CSI-RS from the cell, determines channel feedback information for the at least one bandwidth part based on the CSI-RS, sends the channel feedback information to the cell, and receives data transmitted by the cell based on the channel feedback information.

41 Claims, 8 Drawing Sheets

(56) References Cited

OTHER PUBLICATIONS

Motorola: "On Demodulation-RS and CSI-RS Design and Overhead", 3GPP Draft; RI-091340 RS Design (Motorola), 3rd Generation Partnership Project (3GPP), Mobile Competence Centre, Mar. 18, 2009, XP050338937, France [retrieved on Mar. 18, 2009].

Nokia et al: "Multi-cell CSI-RS transmission and related impact to LTE Rel'8", 3GPP Draft; R1-093910, 3rd Generation Partnership Project (3GPP), Mobile Competence Centre, Oct. 12, 2009, XP050388412, France [retrieved on Oct. 5, 2009].

Nokia Siemens Networks: "TP: RAN4 LTE-Advanced ITU-R response for June submision", 3GPP Draft; R4-092105, 3rd Generation Partnership Project (3GPP), Mobile Competence Centre, May 9, 2009, XP050342800, France [retrieved on May 9, 2009] p. 3.

QUALCOMM Europe: "Downlink transmission modes in LTE-A", 3GPP Draft; R1-093130 DL Transmission Modes in LTEA, 3rd Generation Partnership Project (3GPP), Mobile Competence Centre, Aug. 19, 2009, XP050351499, France [retrieved on Aug. 19, 2009].

S. Lu et Al: "Channel-Aware Frequency Domain Packet Scheduling for MBMS in LTE", VTC Jun. 12, 2009, pp. 1-5, XP002638257, IEEE Retrieved from the Internet: URL: http://i eeexplore.i eee.org/stamp/stamp. jsp"tp=&arnumber=5073439 [retrieved on May 23, 2011] p. 2, col. 1, last paragraph—p. 2, col. 2, paragraph 2.

"System level evaluation of CQI compression schemes for EUTRA", 3GPP Draft; R1-072099, 3rd Generation Partnership Project (3GPP), Mobile Competence Centre, May 2, 2007, XP050105852, France [retrieved on May 2, 2007].

Details of CSI-RS, 3GPP TSG-RAN WG1 #59, R1-094867, Nov. 9-13, 2009, Jeju, Korea.

\* cited by examiner

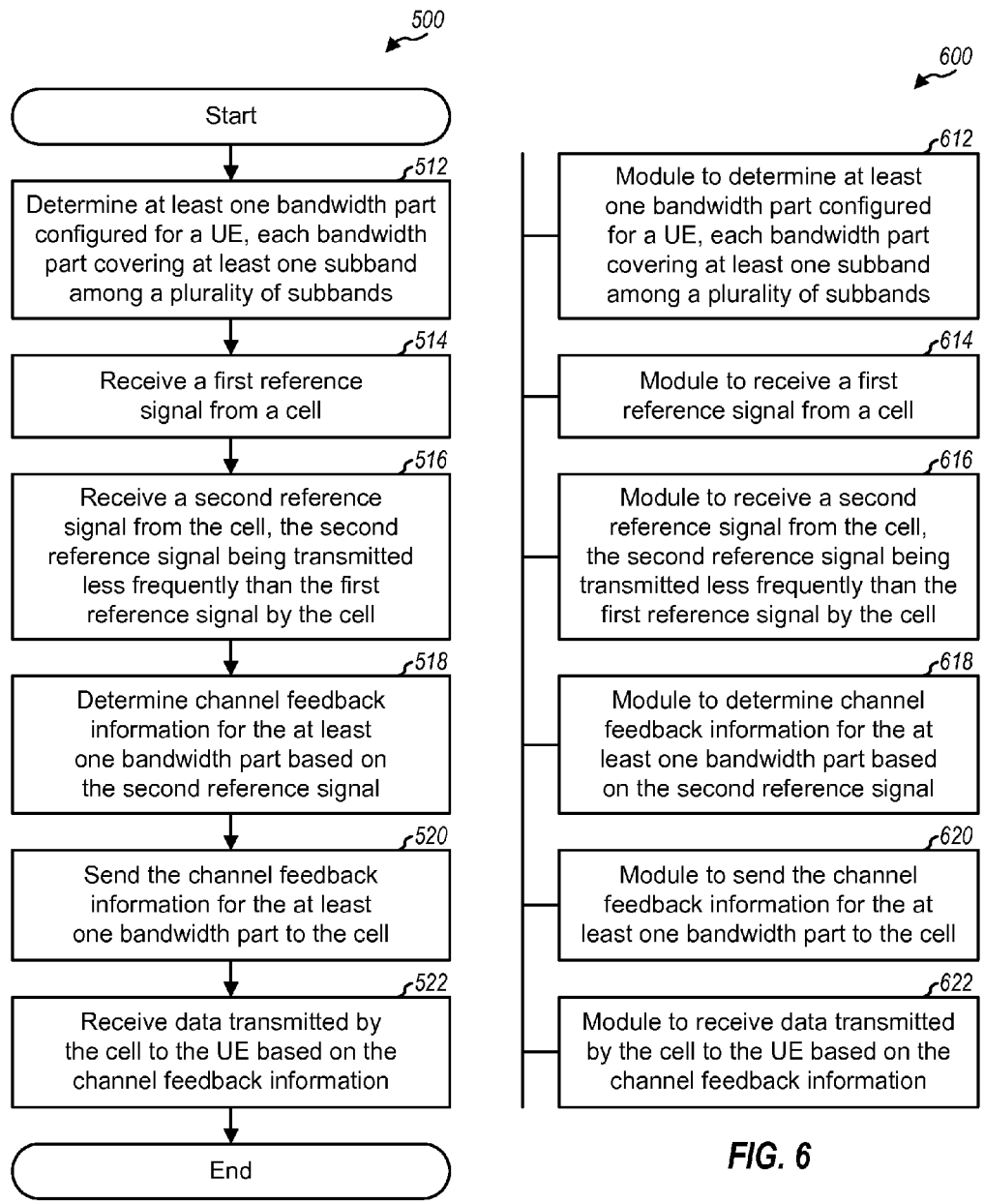

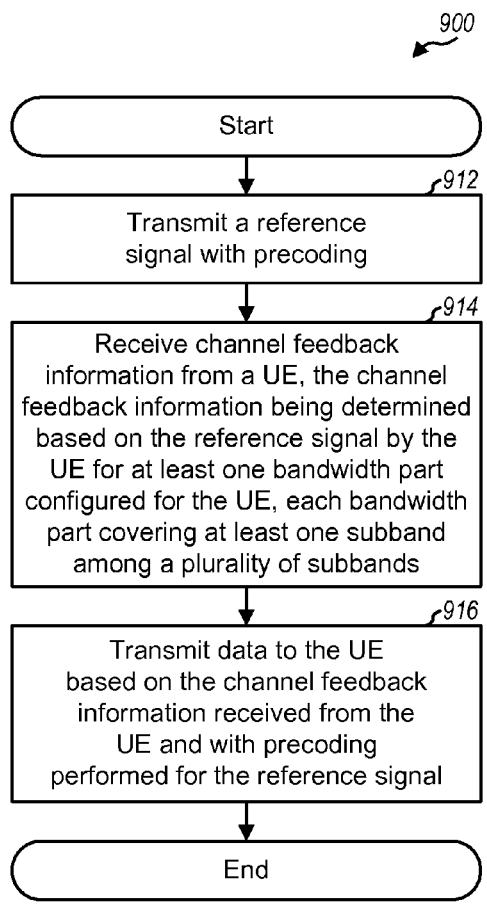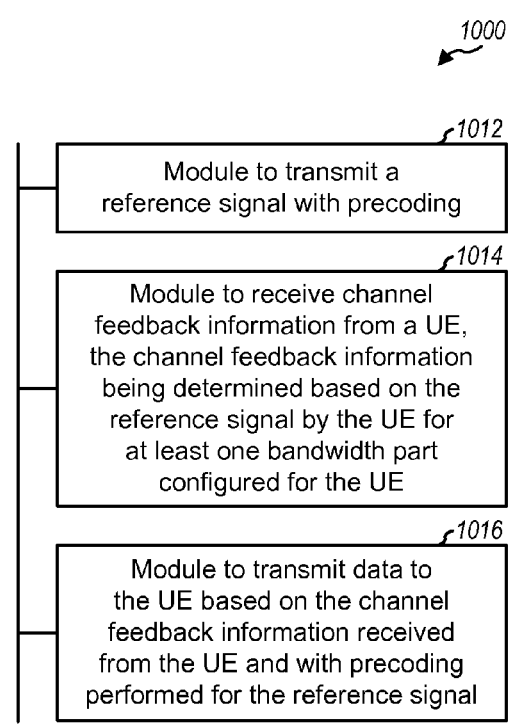
FIG. 9
FIG. 10

CHANNEL FEEDBACK BASED ON REFERENCE SIGNAL

CROSS-REFERENCE

The present application claims priority to U.S. Provisional Application Ser. No. 61/294,941, entitled "CHANNEL FEEDBACK BASED ON REFERENCE SIGNAL," filed Jan. 14, 2010, assigned to the assignee hereof and incorporated herein by reference.

BACKGROUND

I. Field

The present disclosure relates generally to communication, and more specifically to techniques for reporting channel feedback information for wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may transmit data on the downlink to a UE. Good performance may be achieved for downlink data transmission by having the UE measure the channel conditions on the downlink, determine channel feedback information based on the measured channel conditions, and sending the channel feedback information to the base station. The channel feedback information may comprise various types of information that may be used to transmit data, as described below. It may be desirable to efficiently report channel feedback information.

SUMMARY

Techniques for supporting channel measurement and reporting by UEs in a wireless communication system are described herein. In one design, a cell may transmit a first reference signal, e.g., a cell-specific reference signal (CRS), which may be used by the UEs for channel estimation, coherent demodulation, etc. The cell may also transmit a second reference signal, e.g., a channel spatial information reference signal (CSI-RS), which may be used by the UEs for channel measurement, channel feedback reporting, etc. The cell may transmit the second reference signal less frequently than the first reference signal, or from more antenna ports than the first reference signal, or on fewer resource elements than the first reference signal, or a combination thereof.

In another design, a cell may transmit a reference signal with precoding. The cell may receive channel feedback information from a user equipment (UE). The channel feedback information may be determined based on the reference signal by the UE for at least one bandwidth part configured for the UE. Each bandwidth part may cover at least one subband among a plurality of subbands.

In one design, a UE may determine at least one bandwidth part configured for the UE, with each bandwidth part covering at least one subband among a plurality of subbands. The UE may receive the first and second reference signals from the cell. The UE may determine channel feedback information for the at least one bandwidth part based on the second reference signal. The channel feedback information may comprise channel quality indicator (CQI), or rank indicator (RI), or precoding matrix indicator (PMI), or channel direction indicator (CDI), or a combination thereof. The UE may send the channel feedback information for the at least one bandwidth part to the cell. The UE may thereafter receive data transmitted by the cell to the UE based on the channel feedback information. In general, the UE may receive the second reference signal from one or more cells, determine channel feedback information for each cell of interest, and send the channel feedback information to at least one cell.

Various aspects and features of the disclosure are described in further detail below.

BRIEF DESCRIPTION OF THE DRAWINGS

FIGS. 5 and 6 show a process and an apparatus, respectively, for performing channel measurement and reporting.

FIGS. 9 and 10 show another process and another apparatus, respectively, for supporting channel measurement and reporting.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
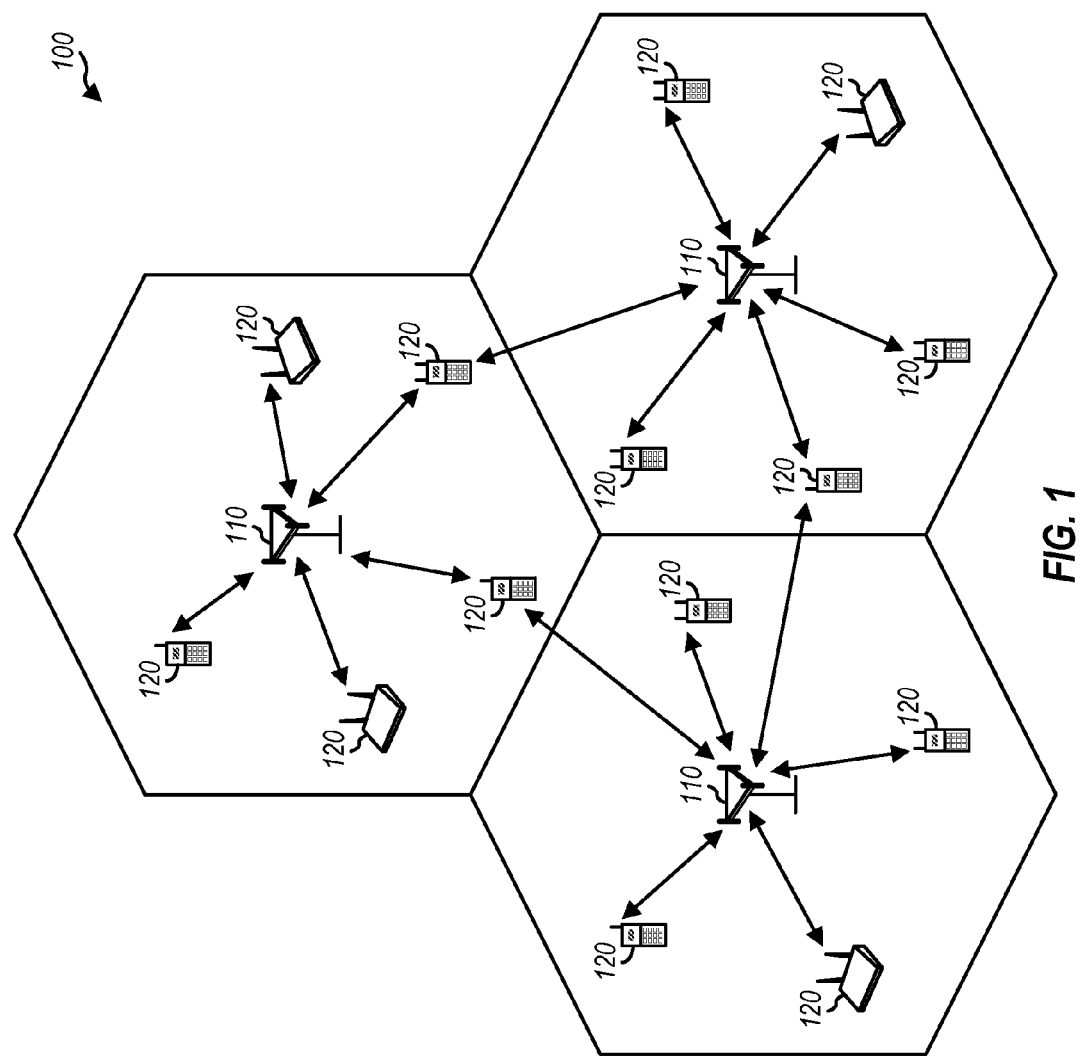
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. An eNB may support one or multiple (e.g., three) cells.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Figure 2:
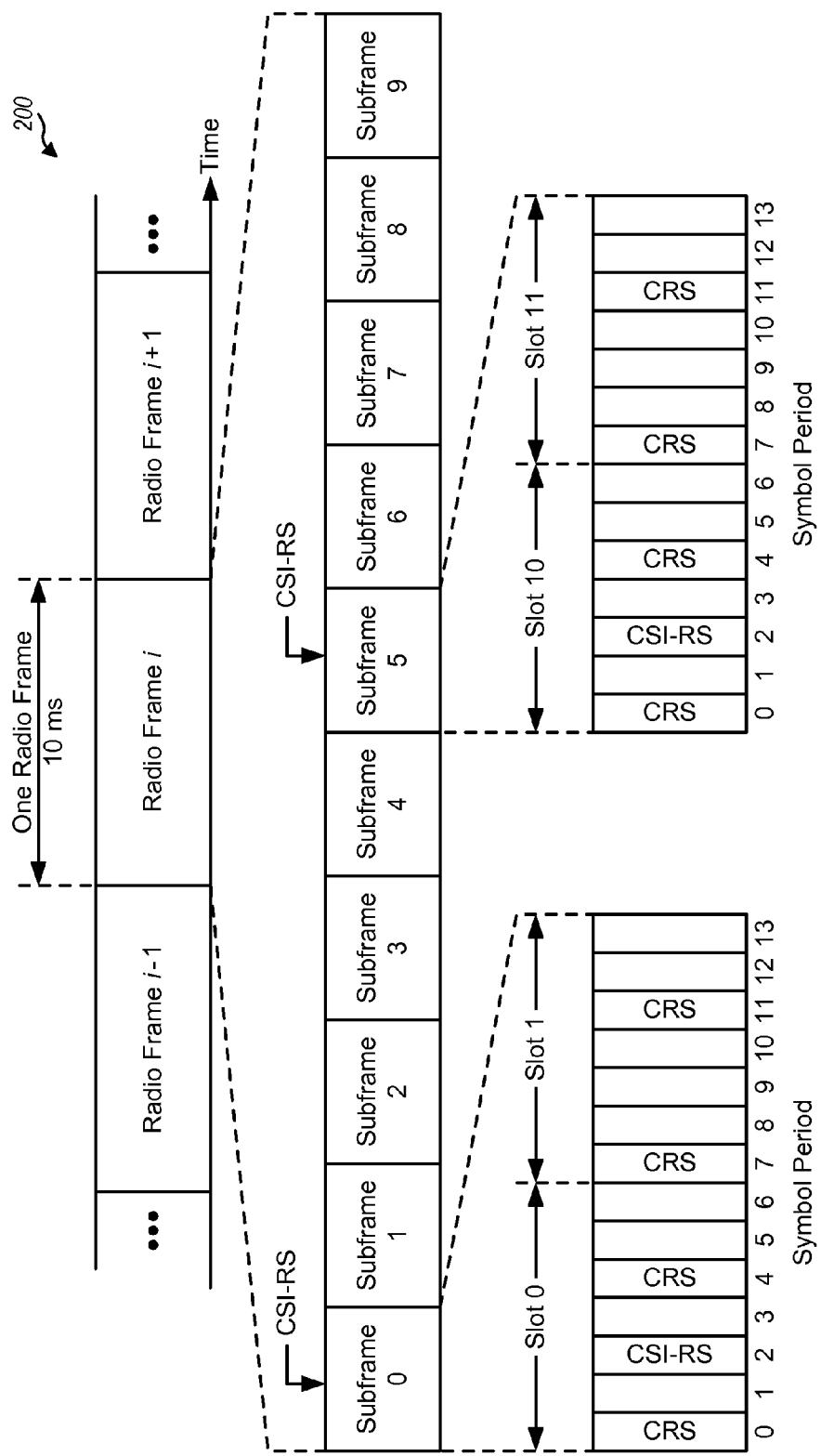
FIG. 2 shows an exemplary frame structure.

FIG. 2 shows an exemplary frame structure 200 used for the downlink in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The time-frequency resources available for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be transmitted in each symbol period of a subframe. An OFDM symbol may include modulation symbols of non-zero values for resource elements used for transmission and zero values for resource elements not used for transmission.

FIG. 2 also shows an exemplary transmission of some reference signals in LTE. A reference signal is a signal that is known a priori by a transmitter and a receiver and may also be referred to as a pilot, a preamble, a training sequence, etc. A cell-specific reference signal (CRS) is a reference signal that is specific for a cell, e.g., generated based on a cell identity (ID). The CRS may be transmitted on the downlink in each subframe and may be used for various purposes such as channel estimation, coherent demodulation, etc.

Figure 3:
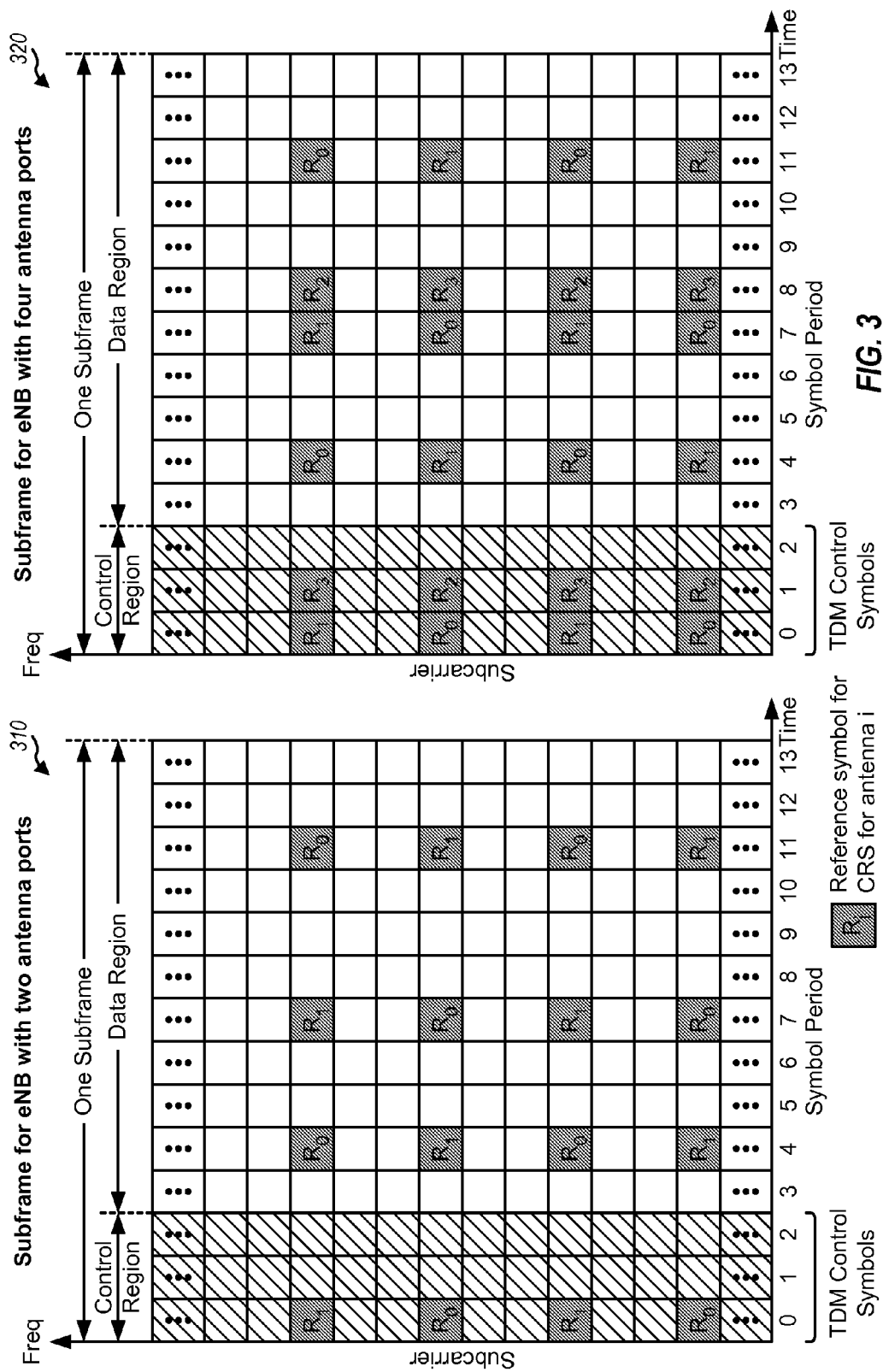
FIG. 3 shows two exemplary regular subframe formats.

FIG. 3 shows two exemplary subframe formats 310 and 320 for the downlink for the normal cyclic prefix. As shown in FIG. 3, a subframe for the downlink may include a control region followed by a data region. The control region may include the first Q OFDM symbols of the subframe, where Q may be equal to 1, 2, 3 or 4. Q may change from subframe to subframe and may be conveyed in the first symbol period of the subframe. The first Q OFDM symbols may carry control information. The data region may include the remaining 2L−Q symbol periods of the subframe and may carry data and/or other information for UEs.

Subframe format 310 may be used for an eNB equipped with two antenna ports. The eNB may transmit a CRS for each cell supported by the eNB in symbol periods 0, 4, 7 and 11. In FIG. 3, for a given resource element with label $R_i$, a reference symbol may be transmitted on that resource element from antenna port i, and no modulation symbols may be transmitted on that resource element from other antenna ports. An antenna port may also be referred to as an antenna, an antenna element, etc. Subframe format 320 may be used by an eNB equipped with four antenna ports. The eNB may transmit a CRS for each cell supported by the eNB in symbol periods 0, 1, 4, 7, 8 and 11. For both subframe formats 310 and 320, the eNB may transmit the CRS for each cell on eight resource elements for each of antenna ports 0 and 1 in one pair of resource blocks. The resource elements not used for the CRS may be used to transmit data and/or other information.

In an aspect, a channel spatial (or state) information reference signal (CSI-RS) may be transmitted less often than the CRS and may be used for various purposes such as channel measurement, channel feedback reporting, etc. In the example shown in FIG. 2, the CSI-RS is transmitted every 5 ms in subframes 0 and 5 of each radio frame. The CSI-RS may also be transmitted with other periodicity and/or in other subframes. In the design shown in FIG. 2, the CSI-RS is transmitted in only one symbol period in each of subframes 0 and 5. In general, the CSI-RS may be transmitted in any number of symbol periods in each CSI-RS subframe, which is a subframe in which the CSI-RS is transmitted.

The CSI-RS may be used by the UEs for channel measurement to obtain channel feedback information for channel quality and spatial properties. The channel feedback information may also be referred to as channel state information, channel information, etc., and may comprise one or more of the following:

Rank indicator (RI)—indicate the number of data streams or codewords to transmit in parallel (or the number layers to use for data transmission), Channel quality indicator (CQI)—indicate the channel quality of each of one or more data streams, Precoding matrix indicator (PMI)—indicate a precoding matrix to use for precoding data, Channel direction indicator (CDI)—indicate a spatial direction (e.g., a dominant eigenvector) for transmitting data, and Other information that may be used to transmit data.

The channel feedback information derived based on the CSI-RS may be used for various transmission modes such as (i) single-user multiple-input multiple-output (SU-MIMO) transmission from a single cell to one UE, (ii) multiple-user MIMO (MU-MIMO) transmission from a single cell to multiple UEs, (iii) coordinated multi-point transmission (CoMP) from multiple cells to one or more UEs, and/or (iv) other transmission modes.

The CSI-RS may be transmitted by each cell in various manners. In one design, the CSI-RS may have one or more of the following characteristics:

The CSI-RS is cell-specific,

The CSI-RS is transmitted infrequently (or sparse in time) with a configurable periodicity/duty cycle, e.g., 2 ms, 5 ms, 10 ms, 20 ms, etc., The CSI-RS spans the entire system bandwidth but is transmitted on few resource elements across frequency (or sparse in frequency), e.g., on two or fewer resource elements per antenna port for each resource block in which the CSI-RS is transmitted, The CSI-RS is transmitted from up to 8 antenna ports, and the number of antenna ports for the CSI-RS may be configured (e.g., statically), The CSI-RS punctures data in the data region of a subframe, Intra-cell CSI-RS multiplexing in single subframe is baseline, and The CSI-RS is transmitted based on a CSI-RS pattern, which may avoid the control region and OFDM symbols carrying the CRS.

The CSI-RS pattern for a cell may indicate specific resource elements on which to transmit the CSI-RS by the cell. The CSI-RS pattern may have one or more of the following characteristics:

The CSI-RS pattern is cell-specific,

The CSI-RS pattern is dependent on the number of antenna ports, system time, cell ID of a cell, etc., The CSI-RS pattern is present in CSI-RS subframes with a given periodicity, The CSI-RS pattern is limited to a subset of all subframes, which is referred to as a CSI-RS subframe set, in each period of a particular duration, and The CSI-RS pattern for different antenna ports of different cells may hop in time, and the hopping may be dependent on the cell ID, antenna port index, system time, etc.

The CSI-RS subframe set may exclude subframes in which a physical broadcast channel (PBCH) or synchronization signals are present in order to avoid interfering with the PBCH and the synchronization signals.

To reduce the rate of collision between the CSI-RS for different cells, the subframes in which the CSI-RS is transmitted may hop within the CSI-RS subframe set over time. The CSI-RS hopping may be common across cells (i.e., cell-specific CSI-RS hopping may be disabled) by using a default value for cell ID in a hopping function. Common CSI-RS hopping across cells may be beneficial to support CoMP techniques such as joint transmission, which may involve a number of cells.

The CSI-RS may be transmitted from a configurable number of antenna ports. The CSI-RS for different antenna ports of the same cell may be orthogonally multiplexed with time division multiplexing (TDM), or code division multiplexing (CDM), or frequency division multiplexing (FDM), or a combination thereof. The CSI-RS for each antenna port may be evenly spaced across frequency in one OFDM symbol, e.g., with a frequency spacing of 6 subcarriers.

A cell may limit the number of antenna ports from which to transmit the CRS (e.g., to at most two antenna ports) whenever the number of antenna ports is sufficiently large (e.g., greater than two). Limiting the number of antenna ports for the CSI-RS may (i) enable a lower reuse factor on the CSI-RS without increasing the number of subframes used for the CSI-RS and (ii) avoid power sharing with a UE-specific reference signal (UE-RS). For CoMP, resource elements used by multiple cells for data transmission to one or more UEs may be punctured by the CSI-RS.

Table 1 lists some characteristics of the CRS and the CSI-RS for comparison.

TABLE 1

| Parameter | CRS | CSI-RS |
| --- | --- | --- |
| Periodicity | Transmitted in every subframe | Transmitted in every 2, 5, 10, 20, or some other number of subframes |
| Frequency | Transmitted across entire system bandwidth | Transmitted across entire system bandwidth |
| Density | Transmitted on 8 resource elements in a resource block pair | Transmitted on 1 or 2 resource elements in a resource block pair |
| Number of Antenna Ports | Transmitted from up to 4 antenna ports | Transmitted from up to 8 antenna ports |
| Configurability | Fixed - defined in standard. | Configurable by a cell. |

In an aspect, a UE may make channel measurement based on the CSI-RS instead of, or in addition to, the CRS. Furthermore, the UE may make channel measurement for all or a portion of the system bandwidth. The UE may determine channel feedback information based on the channel measurement and may report the channel feedback information to one or more cells.

A cell may transmit the CSI-RS to UEs within its coverage. The cell and one or more neighbor cells may participate in inter-cell interference coordination (ICIC) in order to ensure a reliable CSI-RS for channel measurement by the UEs in the cell. To improve the penetration/coverage of the CSI-RS, a cell may transmit the CSI-RS in the data region of a subframe, and its neighbor cells may perform ICIC on the corresponding resource elements in the data region such that the data transmissions from the neighbor cells do not cause excessive interference to the CSI-RS from the cell. The cell may transmit the CSI-RS across the entire system bandwidth, and ICIC may be implemented as follows:

Have interfering cells blank out (i.e., not transmit on) the entire data region of a subframe in which the CSI-RS is transmitted, or at least blank out the resource elements colliding with the resource elements used to transmit the CSI-RS, or Have interfering cells transmit data at a low power level to reduce interference to the CSI-RS from the cell.

For the blanking/puncturing scheme, a decision on whether or not to perform blanking may be dependent on channel conditions observed by the UEs. For example, blanking may be performed if the UEs observe excessive interference or may be skipped otherwise. One cell may interfere with multiple cells and may then blank all resource elements or subframes used by these multiple cells to transmit their CSI-RS. Blanking may be inefficient, especially when having to blank for multiple cells.

The power reduction/control scheme may be especially applicable for a homogenous system with cells of the same type, e.g., macro cells. However, power reduction may be inefficient for a heterogeneous system with cells of different types, e.g., macro cells, femto cells, etc. Power reduction may also be inefficient for UEs that can operate with low geometries or received signal qualities, e.g., with geometries as low as −20 dB.

Blanking or power reduction may ensure that UEs can reliably receive CSI-RS for channel measurement. However, UEs that need reliable CSI-RS for channel measurement will likely not be scheduled across the entire system bandwidth. These UEs may not need to measure the CSI-RS across the entire system bandwidth and may not need to report channel quality for the entire system bandwidth.

In light of the above observations, blanking or power reduction via ICIC may be implemented in a TDM manner and/or an FDM manner in order to improve efficiency. For TDM, an interfering cell may blank or reduce power in only certain subframes instead of all subframes in which the CSI-RS is transmitted. For FDM, an interfering cell may blank or reduce power on only certain parts of the system bandwidth instead of the entire system bandwidth. For both TDM and FDM, an interfering cell may blank or reduce power on only certain parts of the system bandwidth in certain subframes in which the CSI-RS is transmitted. Blanking or power reduction with TDM and/or FDM may improve efficiency over blanking or reducing transmit power over the entire data region and across the entire system bandwidth. It may not be necessary to blank or power reduction across the entire system bandwidth since the UEs that need reliable CSI-RS are unlikely to be scheduled on the entire system bandwidth.

In one design, the system bandwidth may be partitioned based on a hierarchical structure in order to support more efficient channel measurement and reporting as well as more efficient blanking or power reduction via ICIC. The hierarchical structure may allow UEs to perform channel measurement and reporting for only certain parts of the system bandwidth. The hierarchical structure may also allow cells to blank or reduce transmit power on only certain parts of the system bandwidth.

Figure 4:
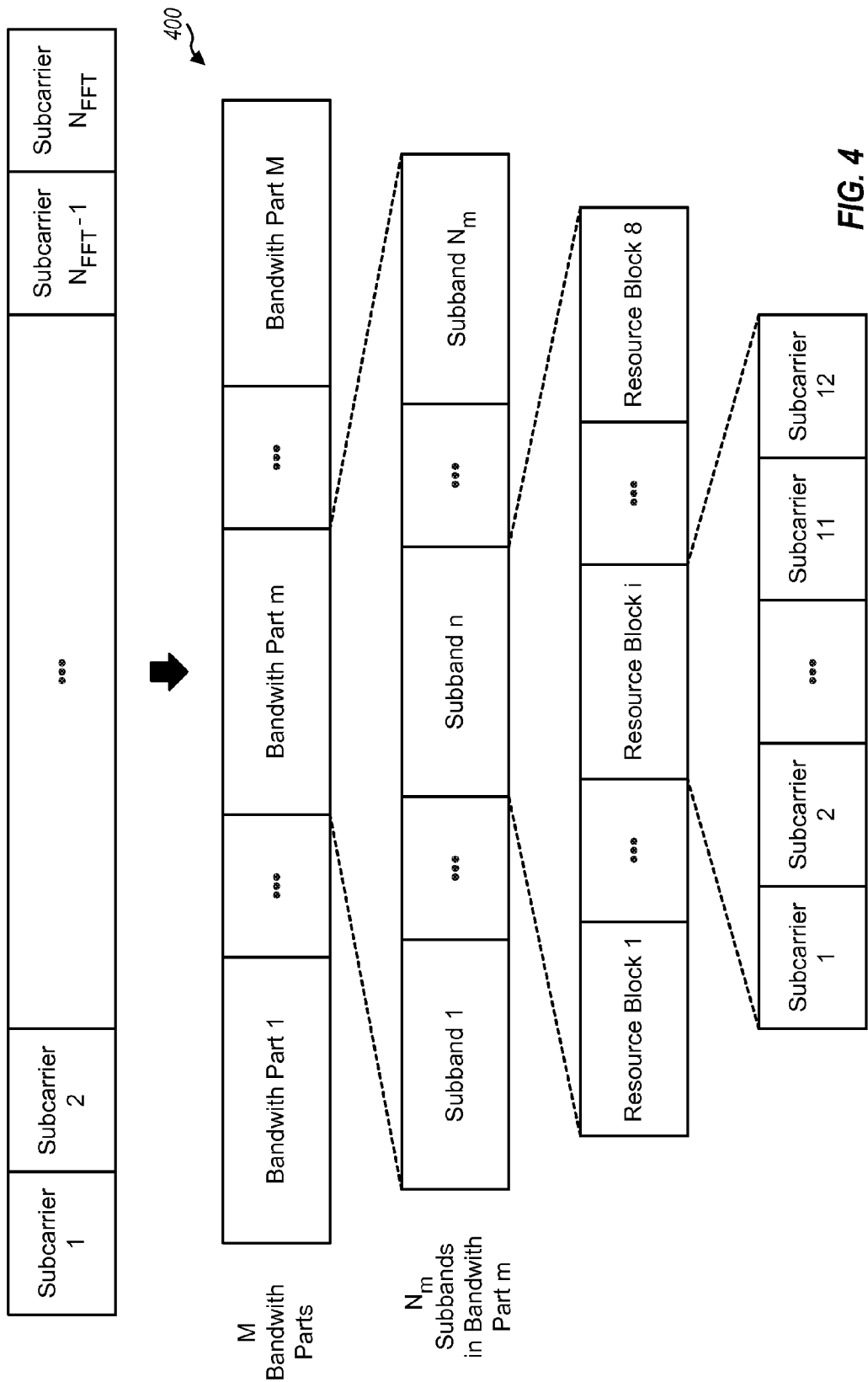
FIG. 4 shows an exemplary hierarchical structure in frequency.

FIG. 4 shows a design of a hierarchical structure 400 that may be used for channel measurement and reporting. $N_{FFT}$ total subcarriers may be obtained with OFDM. A subset of the $N_{FFT}$ total subcarriers may be usable for transmission, and the remaining subcarriers (e.g., near both edges of the system bandwidth) may be unused and serve as guard subcarriers. The usable subcarriers may be used to form resource blocks, with each resource block covering 12 contiguous subcarriers. The number of resource blocks in each slot may be dependent on the system bandwidth and may range from 6 to 110 for system bandwidth of 1.25 to 20 MHz.

A number of subbands may be defined. In one design, for channel feedback, each subband may include 96 contiguous subcarriers for eight resource blocks and may cover 1.44 MHz. The number of subbands may be dependent on system bandwidth and may range from 1 to 13 for system bandwidth of 1.25 to 20 MHz. For 20 MHz bandwidth, the first 12 subbands may each cover eight resource blocks, and the last subband may cover four resource blocks.

M bandwidth parts may also be defined, where M may be one or greater. A bandwidth part may also be referred to as a subband group, a group, a frequency range, etc. Bandwidth part m, for m∈{1, . . . , M}, may include $N_m$ contiguous subbands, where $N_m$ may be one or greater. The M bandwidth parts may have the same size or different sizes. It may be desirable to define the M bandwidth parts to have sizes that are equal or as close to equal as possible. The number of bandwidth parts and the size of each bandwidth part may be configurable and may be dependent on the system bandwidth.

In one design, a UE may be configured (e.g., semi-statically) with a UE-specific set that may cover all or a portion of the system bandwidth in which the UE should use the CSI-RS for channel measurement and feedback. The UE-specific set may include all or a subset of the M bandwidth parts. The UE may be configured with one or more bandwidth parts based on channel conditions observed by the UE and/or other factors.

As an example, three bandwidth parts G1, G2 and G3 may be defined with 13 subbands S1 through S13 for a system bandwidth of 20 MHz, as follows:
G1={S1, S2, S3, S4},
G2={S5, S6, S7, S8}, and
G3={S9, S10, S11, S12, S13}.

A first UE may be configured with all three bandwidth parts if the CSI-RS is deemed reliable for this UE over the entire system bandwidth (e.g., no overwhelming inter-cell interference). In this case, the first UE may have a UE-specific set X1 that may be given as X1={G1, G2, G3}. A second UE may be configured with only one bandwidth part G1, and a UE-specific set X2 for the second UE may be given as X2={G1}. The second UE may use the CSI-RS in only bandwidth part G1 for channel measurement and feedback. Interfering cells may blank or reduce transmit power on only bandwidth part G1 and may schedule data transmissions on bandwidth parts G2 and G3 without interfering the channel measurement by the second UE.

In one design, a UE may be configured with a UE-specific set X that may hop across the system bandwidth over time to obtain frequency diversity. The hopping may be based on a hopping pattern or sequence, which may be dependent on one or more parameters such as cell ID, UE ID, subframe ID, CSI-RS configurations that are cell specific, etc. The hopping may also be based on channel conditions observed by the UE. For example, the UE-specific set X may include only bandwidth parts in which the UE observes sufficiently good channel conditions and may omit bandwidth parts in which the UE observes poor channel conditions. As another example, the UE-specific set X may include good bandwidth parts more frequently (or with a shorter periodicity) and poor bandwidth parts less frequently (or with a longer periodicity).

As an example, the UE may be configured with bandwidth part G1 in one time interval, then bandwidth part G2 in the next time interval, then bandwidth part G3 in the following time interval, then bandwidth part G1 in the next time interval, etc. The hopping for the UE may be given as follows:
G1→G2→G3→G1→G2→ . . . .

In the example above, the UE may cycle through the three bandwidth parts over time and may be configured with the same periodicity for each bandwidth part. In general, the UE may be configured with one or more bandwidth parts having the same or different periodicities. For example, the UE may be configured with bandwidth part G1 twice as often as bandwidth parts G2 and G3, as follows:
G1→G2→G1→G3→G1→G2→G1→G3→ . . . .

In another design, a UE may be configured with a cell-specific set Y that may cover all or a portion of the system bandwidth in which the UE should use the CSI-RS for channel measurement and feedback. A serving cell for the UE and one or more neighbor cells may coordinate to reserve a different set of resource elements for each cell to transmit its CSI-RS. The cell-specific set Y for the serving cell may then have little or no interference from the neighbor cells.

In yet another design, a UE may be configured with a UE-specific set Z that may be confined within cell-specific CSI-RS subframes. For example, the UE-specific set Z may include only some of the subframes in which the serving cell transmits the CSI-RS. The UE may then make channel measurement for the CSI-RS in only the subframes indicated by the UE-specific set Z instead of in each subframe in which the CSI-RS is transmitted.

A UE may also be configured with any combination of set X, set Y, set Z and/or other sets. The UE may perform channel measurement for all configured sets.

Set X, set Y, and/or set Z may be determined by multiple cells, e.g., based on resources used by the cells, long-term interference conditions, etc. Set X, set Y, and/or set Z may also be determined for multiple UEs, which may be configured with the same set X, set Y, and/or set Z. Set X, set Y, and/or set Z may be determined through backhaul negotiations or over-the-air signaling.

One or more channel feedback types may be supported. Each channel feedback type may specify how channel measurement should be performed and reported by a UE. Each channel feedback type may cover reporting of any type of channel feedback information. For simplicity, the description covers reporting of CQI.

In one design, one or more of the following channel feedback types may be supported:
  Entire band feedback—a CQI value may be determined and reported for all configured bandwidth parts or the entire system bandwidth,
  Wideband feedback—a CQI value may be determined and reported for each configured bandwidth part, and
  Subband feedback—a CQI value may be determined and reported for each of one or more subbands in a configured bandwidth part.

A UE may be configured with one or more channel feedback types. For example, the UE may be configured with only wideband feedback, or only subband feedback, or both wideband feedback and subband feedback, or both entire band feedback and subband feedback, or some other combination of channel feedback types. The UE may determine and report channel feedback information based on each configured channel feedback type.

For entire band feedback, the UE may be configured to make channel measurement across all configured bandwidth parts and/or the entire system bandwidth. The UE may then make channel measurement, as configured, based on the CSI-RS. The UE may obtain a single CQI value for all configured bandwidth parts or the entire system bandwidth and may report this CQI value.

For wideband feedback, the UE may make channel measurement for each configured bandwidth part based on the CSI-RS received in that bandwidth part and may obtain a CQI value for the bandwidth part. The UE may report a set of CQI values for a set of bandwidth parts configured for the UE.

For subband feedback, the UE may make channel measurement for each subband of interest in each configured bandwidth part based on the CSI-RS received in the subband. For example, for each configured bandwidth part, the UE may make channel measurement for each subband in the bandwidth part or for each of N best subbands in the bandwidth part. N may be one or greater and may be dependent on bandwidth part. For example, N may be larger for a bandwidth part in which the UE observes good channel conditions and may be smaller for a bandwidth part in which the UE observes poor channel conditions. The UE may obtain a set of CQI values for a set of subbands of interest in all configured bandwidth parts. The UE may report this set of CQI values.

The UE may be configured with one or more bandwidth parts that may hop. In each time interval, the UE may make channel measurement for the bandwidth part(s) configured for that time interval. The UE may make channel measurement for different bandwidth parts in different time intervals with hopping. In one design, cell-specific CSI-RS hopping may be selectively disabled, e.g., by setting a cell ID entry in a hopping seed to a common default value. In one design, multiple cells may hop together, which may be beneficial to support CoMP techniques such as joint transmission from a number of transmitting nodes.

The UE may report absolute and/or differential CQI values. An absolute CQI value may convey CQI based solely on that value. A differential CQI may convey the difference in CQI between the current CQI and a reference CQI. The reference CQI may be for a prior time interval, or another subband, or another bandwidth part, etc. The UE may report absolute CQI values for some time intervals and/or some bandwidth parts or subbands. The UE may report differential CQI values for some other time intervals and/or some other bandwidth parts or subbands.

For clarity, reporting of CQI has been described above. The designs described herein may be applicable for all types of channel feedback information, e.g., RI, CQI, PMI, CDI, etc.

In one design, a cell may transmit the CSI-RS without precoding, e.g., from each antenna port configured for transmitting the CSI-RS. In another design, a cell may transmit the CSI-RS with precoding. This design may be especially applicable for home eNBs (HeNBs), since each home eNB may be associated with only one UE or few UEs. A cell may transmit the CSI-RS with precoding, e.g., in similar manner as data, to facilitate more effective channel measurement and feedback that can account for different interference scenarios. In one design, a cell may selectively transmit the CSI-RS with or without precoding. For example, the cell may initially transmit the CSI-RS without precoding and may receive channel feedback information from one or more UEs. The cell may then determine a suitable precoding matrix based on the channel feedback information from all UEs and may transmit the CSI-RS with precoding based on the precoding matrix.

A cell (e.g., a scheduler for the cell) may decide whether to transmit the CSI-RS with or without precoding. This decision may be transparent to the UEs, which may not need to know whether or not the CSI-RS was precoded. The UEs may make channel measurement on the CSI-RS with or without precoding and may report channel feedback information to the cell. The cell may interpret the channel feedback information by taking into account the manner in which the CSI-RS is transmitted (e.g., with or without precoding).

FIG. 5 shows a design of a process 500 for performing channel measurement and reporting. Process 500 may be performed by a UE (as described below) or by some other entity. The UE may determine at least one bandwidth part configured for the UE, with each bandwidth part covering at least one subband among a plurality of subbands (block 512). The UE may receive a first reference signal (e.g., a CRS) from a cell (block 514). The UE may also receive a second reference signal (e.g., a CSI-RS) from the cell (block 516). The second reference signal may be transmitted less frequently than the first reference signal by the cell. The second reference signal may also be transmitted from more antenna ports than the first reference signal and/or on fewer resource elements than the first reference signal in each subframe in which the first and second reference signals are transmitted. The second reference signal may also be transmitted with or without precoding by the cell.

The UE may determine channel feedback information for the at least one bandwidth part based on the second reference signal (block 518). The UE may determine the channel feedback information without using the first reference signal or based further on the first reference signal. The channel feedback information may comprise CQI, RI, PMI, CDI, some other information, or a combination thereof. The UE may send the channel feedback information for the at least one bandwidth part to the cell (block 520). The UE may thereafter receive data transmitted by the cell to the UE based on the channel feedback information (block 522).

In one design of block 518, the UE may determine channel feedback information (e.g., a CQI value) for all of the at least one bandwidth part configured for the UE. In another design, the UE may determine channel feedback information for each of the at least one bandwidth part configured for the UE. In yet another design, the UE may determine channel feedback information for each of one or more subbands in each of the at least one bandwidth part configured for the UE. The one or more subbands in each bandwidth part may include (i) all subbands in the bandwidth part or (ii) N best subbands in the bandwidth part, where N may be one or greater. The UE may also determine channel feedback information based on a combination of the designs.

In one design, the UE may obtain a first set of one or more bandwidth parts configured for the UE. The at least one bandwidth part configured for the UE may include the one or more bandwidth parts in the first set, which may have less interference from at least one other cell. The first set may be defined based on hopping and may include one or more bandwidth parts in different portions of system bandwidth in different time intervals. For example, the first set may include a single bandwidth part in each time interval and may cycle through all bandwidth parts in different time intervals. The first set may include multiple bandwidth parts having equal periodicity or different periodicities. The first set may be defined specifically for the UE.

In another design, the first set of one or more bandwidth parts may be defined for the cell. In yet another design, the first set may be defined for another cell. For example, UEs within the coverage of cell A and having cell B as a neighbor cell may have the same set of bandwidth parts, which may be configured for cell B. The second reference signal (or the CSI-RS) of cell B may observe strong interference from cell A. The UEs within the coverage of cell B may measure the second reference signal of cell B across the entire system bandwidth. The UEs within the coverage of cell A may measure the second reference signal of cell B for the set of bandwidth parts configured for cell B, which may have less interference from cell A. The first set of one or more bandwidth parts may thus be defined for a cell and a group of UEs, which may include UEs that have a different cell as their strongest or serving cell.

The UE may also obtain at least one additional set of one or more bandwidth parts applicable for the UE. For example, the first set may be specific for the UE, and the second set may be specific for the serving cell or a neighbor cell. As another example, each of the first set and the at least one additional set may be for a different cell. In any case, the at least one bandwidth part configured for the UE may further include the one or more bandwidth parts in the at least one additional set.

For all designs described above, the at least one bandwidth part configured for the UE may have less interference from at least one other cell than the remaining bandwidth parts. In one design, the UE may receive the second reference signal transmitted across the system bandwidth by the cell and may determine the channel feedback information for only a portion of the system bandwidth, which may correspond to the at least one bandwidth part configured for the UE. In one design, the UE may determine at least one subframe and/or one or more bandwidth parts having reduced interference from at least one cell. The UE may determine the channel feedback information for the at least one bandwidth part based on the second reference signal received in the at least one subframe and/or the one or more bandwidth parts having reduced interference from at least one cell.

The UE may determine and report channel feedback information for the at least one bandwidth part, which may be a portion of the system bandwidth, as described above. The UE may perform channel estimation for all or a portion of the system bandwidth.

FIG. 6 shows a design of an apparatus 600 for performing channel measurement and reporting. Apparatus 600 includes a module 612 to determine at least one bandwidth part configured for a UE, with each bandwidth part covering at least one subband among a plurality of subbands, a module 614 to receive a first reference signal from a cell, a module 616 to receive a second reference signal from the cell, with the second reference signal being transmitted less frequently than the first reference signal by the cell, a module 618 to determine channel feedback information for the at least one bandwidth part based on the second reference signal, a module 620 to send the channel feedback information for the at least one bandwidth part to the cell, and a module 622 to receive data transmitted by the cell to the UE based on the channel feedback information.

Figure 7:
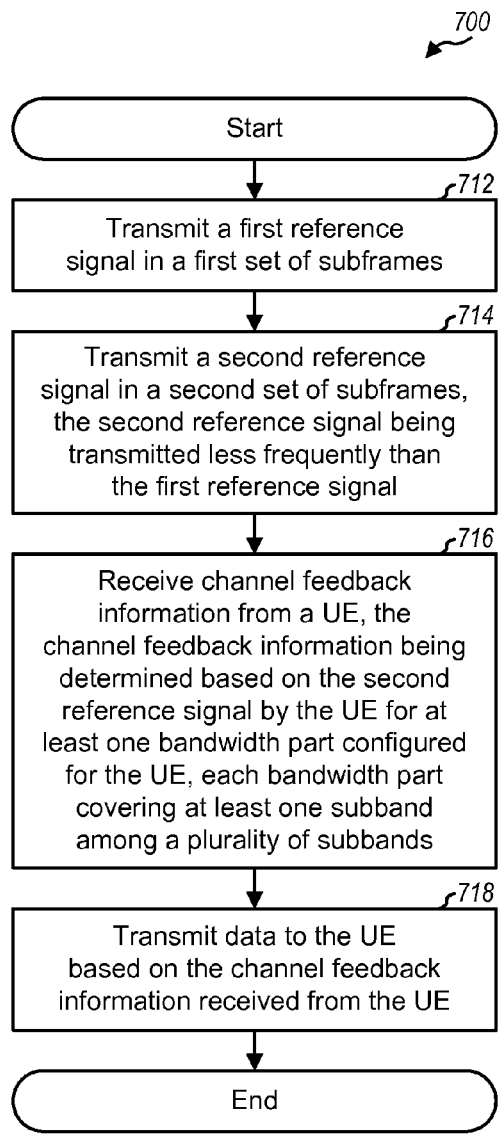
FIGS. 7 and 8 show a process and an apparatus, respectively, for supporting channel measurement and reporting.

FIG. 7 shows a design of a process 700 for supporting communication. Process 700 may be performed by a cell (as described below) or by some other entity. The cell may transmit a first reference signal (e.g., a CRS) in a first set of subframes (block 712). The cell may also transmit a second reference signal (e.g., a CSI-RS) in a second set of subframes (block 714). The cell may transmit the second reference signal less frequently than the first reference signal. The cell may also transmit the second reference signal from more antenna ports and/or on fewer resource elements than the first reference signal in each subframe in which the first and second reference signals are transmitted. The cell may also transmit the second reference signal with or without precoding.

The cell may receive channel feedback information from a UE (block 716). The channel feedback information may be determined based on the second reference signal by the UE for at least one bandwidth part configured for the UE. Each bandwidth part may cover at least one subband among a plurality of subbands.

The cell may transmit data to the UE based on the channel feedback information received from the UE (block 718). In one design, the cell may obtain CQI from the channel feedback information, determine at least one modulation and coding scheme (MCS) based on the CQI, and process at least one data stream based on the at least one MCS. In another design, the cell may obtain PMI from the channel feedback information, determine at least one precoding matrix based on the PMI, and precode at least one data stream based on the at least one precoding matrix. The cell may also process data based on the channel feedback information in other manners.

In one design, the cell may reduce transmission (e.g., not transmit or reduce its transmit power to a lower level) on one or more bandwidth parts, or in one or more subframes, or on one or more bandwidth parts in one or more subframes in order to reduce interference to at least one other second reference signal from at least one other cell. In one design, the bandwidth parts and/or the subframes in which to reduce transmission may be statically or semi-statically configured for the cell. In another design, the cell may determine at least one UE observing strong interference from the cell and may reduce transmission in response to this determination.

Figure 8:
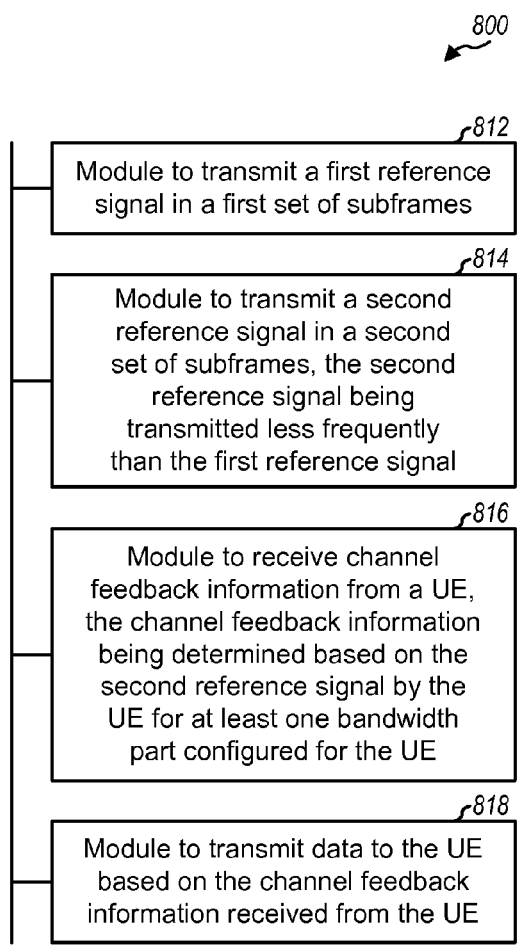

FIG. 8 shows a design of an apparatus 800 for supporting communication. Apparatus 800 includes a module 812 to transmit a first reference signal in a first set of subframes, a module 814 to transmit a second reference signal in a second set of subframes, the second reference signal being transmitted less frequently than the first reference signal, a module 816 to receive channel feedback information from a UE, the channel feedback information being determined based on the second reference signal by the UE for at least one bandwidth part configured for the UE, and a module 818 to transmit data to the UE based on the channel feedback information received from the UE.

FIG. 9 shows a design of a process 900 for supporting communication. Process 900 may be performed by a cell (as described below) or by some other entity. The cell (e.g., a femto cell) may transmit a reference signal (e.g., a CSI-RS) with precoding (block 912). The cell may receive channel feedback information from a UE (block 914). The channel feedback information may be determined based on the reference signal by the UE for at least one bandwidth part configured for the UE, with each bandwidth part covering at least one subband among a plurality of subbands. The cell may transmit data to the UE based on the channel feedback information received from the UE and with precoding performed for the reference signal (block 916).

FIG. 10 shows a design of an apparatus 1000 for supporting communication. Apparatus 1000 includes a module 1012 to transmit a reference signal with precoding, a module 1014 to receive channel feedback information from a UE, the channel feedback information being determined based on the reference signal by the UE for at least one bandwidth part configured for the UE, and a module 1016 to transmit data to the UE based on the channel feedback information received from the UE and with precoding performed for the reference signal.

The modules in FIGS. 6, 8 and 10 may comprise processors, electronic devices, hardware devices, electronic components, logical circuits, memories, software codes, firmware codes, etc., or any combination thereof.

Figure 11:
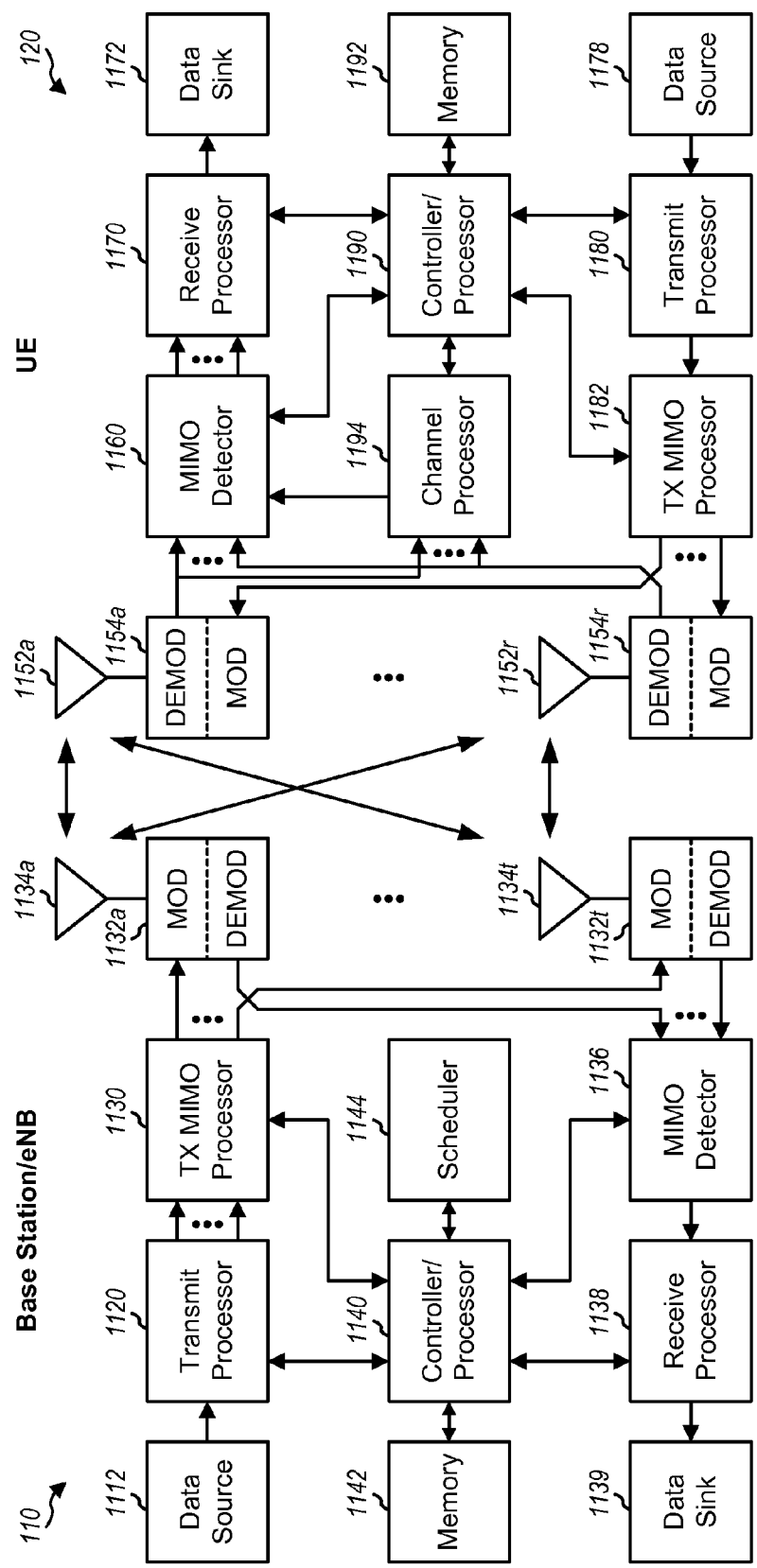
FIG. 11 shows a block diagram of a base station and a UE.

FIG. 11 shows a block diagram of a design of a base station/eNB 110 and a UE 120, which may be one of the eNBs and one of the UEs in FIG. 1. eNB 110 may be equipped with T antennas 1134a through 1134t, and UE 120 may be equipped with R antennas 1152a through 1152r, where in general $T \geq 1$ and $R \geq 1$.

At eNB 110, a transmit processor 1120 may receive data from a data source 1112 for one or more UEs, process (e.g., encode and modulate) the data for each UE based on one or more modulation and coding schemes (MCS) selected for that UE, and provide data symbols for all UE. Transmit processor 1120 may also process control information and provide control symbols. Transmit processor 1120 may also generate reference symbols for a CRS, a CSI-RS, and/or other reference signals for each cell supported by eNB 110. A TX MIMO processor 1130 may precode the data symbols, the control symbols, and/or the reference symbols (if applicable) and may provide T output symbol streams to T modulators (MOD) 1132a through 1132t. Each modulator 1132 may process its output symbol stream (e.g., for OFDM, etc.) to obtain an output sample stream. Each modulator 1132 may further condition (e.g., convert to analog, filter, amplify, and upconvert) its output sample stream and generate a downlink signal. T downlink signals from modulators 1132a through 1132t may be transmitted via T antennas 1134a through 1134t, respectively.

At UE 120, R antennas 1152a through 1152r may receive the downlink signals from eNB 110, and each antenna 1152 may provide a received signal to an associated demodulator (DEMOD) 1154. Each demodulator 1154 may condition (e.g., filter, amplify, downconvert, and digitize) its received signal to obtain samples and may further process the samples (e.g., for OFDM, etc.) to obtain received symbols. Each demodulator 1154 may provide received data symbols to a MIMO detector 1160 and provide received reference symbols to a channel processor 1194. Channel processor 1194 may derive a channel estimate for a wireless channel from eNB 110 to UE 120 based on received reference symbols for the CRS. Channel processor 1194 may also make channel measurement for a set of bandwidth parts configured for UE 120 based on received reference symbols for the CSI-RS. Channel processor 1194 may provide (i) the channel estimate obtained based on the CRS to MIMO detector 1160 and (ii) channel measurement results obtained based on the CSI-RS to a controller/processor 1190. MIMO detector 1160 may perform MIMO detection on the received data symbols (if applicable) based on the channel estimate and may provide detected symbols. A receive processor 1170 may process (e.g., demodulate and decode) the detected symbols and provide decoded data for UE 120 to a data sink 1172.

UE 120 may make channel measurement and determine channel feedback information as described above. The channel feedback information and data from a data source 1178 may be processed (e.g., encoded and modulated) by a transmit processor 1180, spatially processed by a TX MIMO processor 1182 (if applicable), and further processed by modulators 1154a through 1154r to generate R uplink signals, which may be transmitted via antennas 1152a through 1152r. At eNB 110, the uplink signals from UE 120 may be received by antennas 1134a through 1134t, processed by demodulators 1132a through 1132t, detected by a MIMO detector 1136 (if applicable), and further processed (e.g., demodulated and decoded) by a receive processor 1138 to recover the channel feedback information and data sent by UE 120. Controller/processor 1140 may control data transmission to UE 120 based on the channel feedback information. The recovered data may be provided to a data sink 1139.

Controllers/processors 1140 and 1190 may direct the operation at eNB 110 and UE 120, respectively. Processor 1190 and/or other processors and modules at UE 120 may perform or direct process 500 in FIG. 5 and/or other processes for the techniques described herein. Processor 1140 and/or other processors and modules at eNB 110 may perform or direct process 700 in FIG. 7, process 900 in FIG. 9, and/or other processes for the techniques described herein. Memories 1142 and 1192 may store data and program codes for eNB 110 and UE 120, respectively. A scheduler 1144 may schedule UE 120 and/or other UEs for data transmission on the downlink and/or uplink based on the channel feedback information received from all UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining at least one bandwidth part configured for a user equipment (UE), each bandwidth part covering at least one subband among a plurality of subbands, and each bandwidth part comprising a portion of a system bandwidth;
   receiving a first reference signal from a cell;
   receiving a second reference signal from the cell, the second reference signal being transmitted less frequently than the first reference signal by the cell; and
   determining channel feedback information for the at least one bandwidth part based on the second reference signal;
   wherein the first reference signal comprises a cell-specific reference signal (CRS) and the second reference signal comprises a channel state information reference signal (CSI-RS).

2. The method of claim 1, wherein determining the channel feedback information comprises determining channel feedback information for all bandwidth parts configured for the UE.

3. The method of claim 1, wherein determining the channel feedback information comprises determining channel feedback information for each bandwidth part configured for the UE.

4. The method of claim 1, wherein determining the channel feedback information comprises determining channel feedback information for each subband in each bandwidth part configured for the UE.

5. The method of claim 1, wherein determining the channel feedback information comprises determining channel feedback information based on all subbands in each bandwidth part configured for the UE.

6. The method of claim 1, wherein determining the channel feedback information comprises determining channel feedback information for N best subbands in each bandwidth part configured for the UE, wherein N is one or greater.

7. The method of claim 1, wherein receiving the second reference signal comprises receiving the second reference signal transmitted across the system bandwidth by the cell, and wherein determining the channel feedback information comprises determining the channel feedback information based on the second reference signal for only the portion of the system bandwidth corresponding to the at least one bandwidth part.

8. The method of claim 1, further comprising:
   determining at least one subframe having reduced interference from at least one other cell; and
   determining the channel feedback information for the at least one bandwidth part based on the second reference signal received in the at least one subframe.

9. The method of claim 1, further comprising obtaining a set of bandwidth parts, wherein the at least one bandwidth part configured for the UE is included in the set of bandwidth parts.

10. The method of claim 9, wherein the set is defined based on hopping and includes at least one bandwidth part in different portions of the system bandwidth in different time intervals.

11. The method of claim 9, wherein the set includes a single bandwidth part in each time interval and cycles through all bandwidth parts in different time intervals.

12. The method of claim 9, wherein the set includes multiple bandwidth parts having equal periodicity.

13. The method of claim 10, wherein the set includes multiple bandwidth parts having different periodicities.

14. The method of claim 9, wherein the set is defined specifically for the UE.

15. The method of claim 9, wherein the set is defined for the cell or for another cell.

16. The method of claim 9, wherein the bandwidth parts in the set have less interference from the cell or from at least one other cell.

17. The method of claim 9, further comprising obtaining an additional set of bandwidth parts, wherein each of the set and the additional set is for a different cell, and wherein the at least one bandwidth part configured for the UE is included in the additional set.

18. The method of claim 1, wherein the channel feedback information comprises one or more of channel quality indicator (CQI), or rank indicator (RI), or precoding matrix indicator (PMI), or channel direction indicator (CDI), or a combination thereof.

19. The method of claim 1, wherein the second reference signal is transmitted with precoding by the cell.

20. The method of claim 1, further comprising:
transmitting the channel feedback information for the at least one bandwidth part to the cell; and
receiving data transmitted by the cell to the UE based on the channel feedback information.

21. An apparatus for wireless communication, comprising:
means for determining at least one bandwidth part configured for a user equipment (UE), each bandwidth part covering at least one subband among a plurality of subbands, and each bandwidth part comprising a portion of a system bandwidth;
means for receiving a first reference signal from a cell;
means for receiving a second reference signal from the cell, the second reference signal being transmitted less frequently than the first reference signal by the cell; and
means for determining channel feedback information for the at least one bandwidth part based on the second reference signal;
wherein the first reference signal comprises a cell-specific reference signal (CRS) and the second reference signal comprises a channel state information reference signal (CSI-RS).

22. The apparatus of claim 21, wherein the means for determining channel feedback information comprises means for determining channel feedback information for all bandwidth parts configured for the UE, for each bandwidth part configured for the UE, or for each subband in each bandwidth part configured for the UE.

23. The apparatus of claim 21, further comprising means for obtaining a set of bandwidth parts, wherein the at least one bandwidth part configured for the UE is included in the set.

24. The apparatus of claim 21, further comprising:
means for transmitting the channel feedback information for the at least one bandwidth part to the cell; and
means for receiving data transmitted by the cell to the UE based on the channel feedback information.

25. An apparatus for wireless communication, comprising:
a memory unit; and
at least one processor coupled to the memory unit, wherein the at least one processor is configured-to determine at least one bandwidth part configured for a user equipment (UE), each bandwidth part covering at least one subband among a plurality of subbands and each bandwidth part comprising a portion of a system bandwidth, to receive a first reference signal from a cell,
to receive a second reference signal from the cell, the second reference signal being transmitted less frequently than the first reference signal by the cell, and
to determine channel feedback information for the at least one bandwidth part based on the second reference signal;
wherein the first reference signal comprises a cell-specific reference signal (CRS) and the second reference signal comprises a channel state information reference signal (CSI-RS).

26. A computer program product for wireless communications, the computer program product comprising:
a non-transitory computer-readable medium having program code recorded thereon, the program code comprising:
program code to determine at least one bandwidth part configured for a user equipment (UE), each bandwidth part covering at least one subband among a plurality of subbands, and each bandwidth part comprising a portion of a system bandwidth;
program code to receive a first reference signal from a cell;
program code to receive a second reference signal from the cell, the second reference signal being transmitted less frequently than the first reference signal by the cell; and
program code to determine channel feedback information for the at least one bandwidth part based on the second reference signal;
wherein the first reference signal comprises a cell-specific reference signal (CRS) and the second reference signal comprises a channel state information reference signal (CSI-RS).

27. A method for wireless communication, comprising:
transmitting a first reference signal in a first set of subframes;
transmitting a second reference signal in a second set of subframes, the second reference signal being transmitted less frequently than the first reference signal; and
receiving channel feedback information from a user equipment (UE), the channel feedback information being determined based on the second reference signal received by the UE for at least one bandwidth part configured for the UE, each bandwidth part covering at least one subband among a plurality of subbands, and each bandwidth part comprising a portion of a system bandwidth;
wherein the first reference signal comprises a cell-specific reference signal (CRS) and the second reference signal comprises a channel state information reference signal (CSI-RS).

28. The method of claim 27, wherein the first reference signal comprises a cell-specific reference signal (CRS) and the second reference signal comprises a channel state information reference signal (CSI-RS).

29. The method of claim 27, wherein the second reference signal is transmitted from more antenna ports than the first reference signal.

30. The method of claim 27, wherein the second reference signal is transmitted on fewer resource elements than the first reference signal in each subframe in which the first and second reference signals are transmitted.

31. The method of claim 27, wherein the second reference signal is transmitted with precoding.

32. The method of claim 27, further comprising transmitting data to the UE based on the channel feedback information received from the UE.

33. The method of claim 32, wherein the transmitting data to the UE comprises:
obtaining a channel quality indicator (CQI) from the channel feedback information,
determining at least one modulation and coding scheme (MCS) based on the CQI, and
processing at least one data stream based on the at least one MCS.

34. The method of claim 32, wherein the transmitting data to the UE comprises:
obtaining a precoding matrix indicator (PMI) from the channel feedback information,
determining at least one precoding matrix based on the PMI, and
precoding at least one data stream based on the at least one precoding matrix.

35. The method of claim 27, further comprising reducing transmission on at least one bandwidth part, at least one subframe, or on at least one bandwidth part in at least one subframe by a cell to reduce interference to at least one other second reference signal from at least one other cell.

36. The method of claim 35, further comprising:
determining at least one UE observing strong interference from the cell; and
reducing transmission by the cell in response to determining the at least one UE observing strong interference from the cell.

37. An apparatus for wireless communication, comprising:
means for transmitting a first reference signal in a first set of subframes;
means for transmitting a second reference signal in a second set of subframes, the second reference signal being transmitted less frequently than the first reference signal; and
means for receiving channel feedback information from a user equipment (UE), the channel feedback information being determined based on the second reference signal received by the UE for at least one bandwidth part configured for the UE, each bandwidth part covering at least one subband among a plurality of subbands, and each bandwidth part comprising a portion of a system bandwidth;
wherein the first reference signal comprises a cell-specific reference signal (CRS) and the second reference signal comprises a channel state information reference signal (CSI-RS).

38. The apparatus of claim 37, wherein the means for transmitting the second reference signal comprises means for transmitting the second reference signal from more antenna ports than the first reference signal, or on fewer resource elements than the first reference signal in each subframe in which the first and second reference signals are transmitted, or with precoding, or a combination thereof.

39. The apparatus of claim 37, further comprising means for reducing transmission on at least one bandwidth part, at least one subframe, or on at least one bandwidth part in at least one subframe by a cell to reduce interference to at least one other second reference signal from at least one other cell.

40. An apparatus for wireless communication, comprising:
a memory unit; and
at least one processor coupled to the memory unit, the at least one processor configured-to transmit a first reference signal in a first set of subframes,
to transmit a second reference signal in a second set of subframes, the second reference signal being transmitted less frequently than the first reference signal, and
to receive channel feedback information from a user equipment (UE), the channel feedback information being determined based on the second reference signal received by the UE for at least one bandwidth part configured for the UE, each bandwidth part covering at least one subband among a plurality of subbands, and each bandwidth part comprising a portion of a system bandwidth;
wherein the first reference signal comprises a cell-specific reference signal (CRS) and the second reference signal comprises a channel state information reference signal (CSI-RS).

41. A computer program product for wireless communications, the computer program product comprising:
a non-transitory computer-readable medium having program code recorded thereon, the program code comprising:
program code to send a first reference signal in a first set of subframes;
program code to send a second reference signal in a second set of subframes, the second reference signal being sent less frequently than the first reference signal; and
program code to receive channel feedback information from a user equipment (UE), the channel feedback information being determined based on the second reference signal by the UE for at least one bandwidth part configured for the UE, each bandwidth part covering at least one subband among a plurality of subbands, and each bandwidth part comprising a portion of a system bandwidth;
wherein the first reference signal comprises a cell-specific reference signal (CRS) and the second reference signal comprises a channel state information reference signal (CSI-RS).

* * * * *